Figure 4:
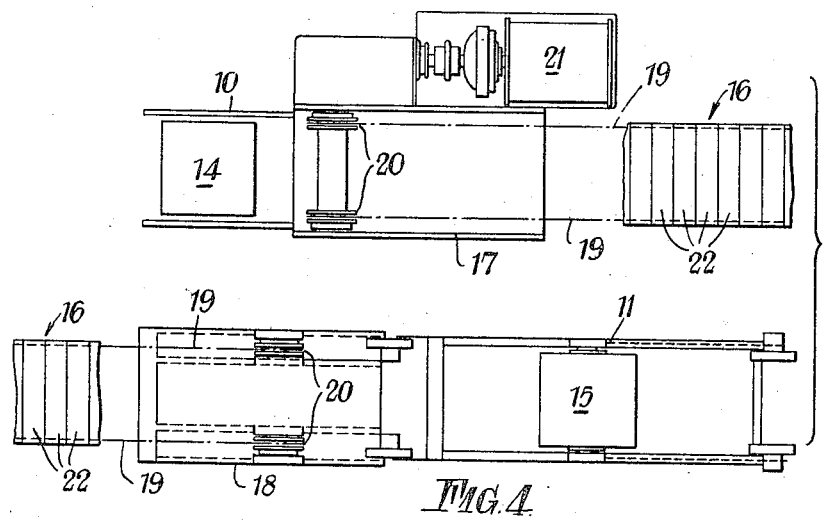

Jan. 19, 1960 F. BAINBRIDGE 2,921,669
TROUGHED CONVEYOR
Filed March 16, 1956 5 Sheets-Sheet 1
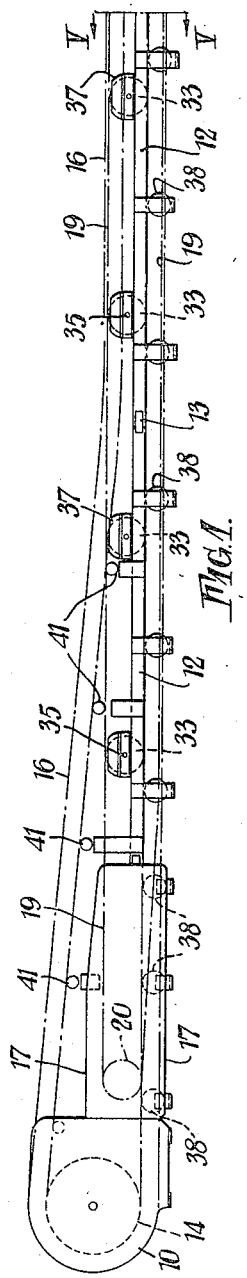
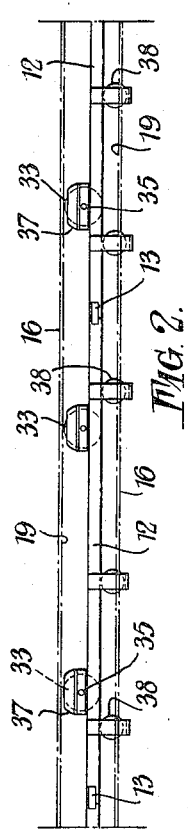
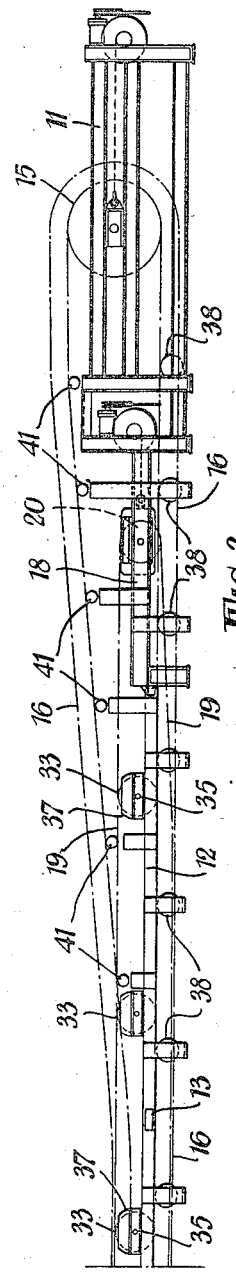
Inventor
Featherstone Bainbridge
by Sommers & Young
Attorneys Jan. 19, 1960   F. BAINBRIDGE   2,921,669
TROUGHED CONVEYOR Filed March 16, 1956   5 Sheets-Sheet 2

Inventor
Featherstone Bainbridge
by Sommers & Young
Attorneys

Jan. 19, 1960   F. BAINBRIDGE   2,921,669
TROUGHED CONVEYOR
Filed March 16, 1956   5 Sheets-Sheet 3
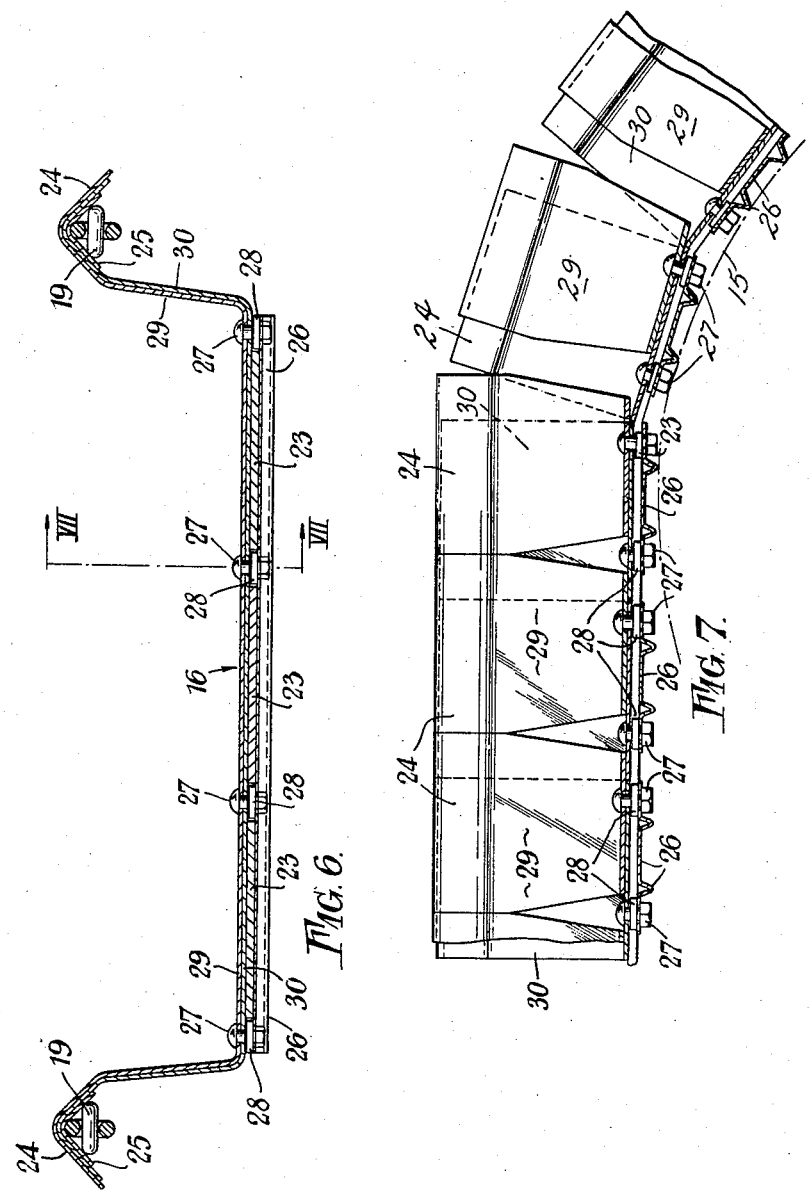
Inventor
Featherstone Bainbridge
by Sommers & Young
Attorneys Jan. 19, 1960

F. BAINBRIDGE 2,921,669

TROUGHED CONVEYOR

Filed March 16, 1956

5 Sheets-Sheet 4

Inventor
Featherstone Bainbridge
by Sommers & Young
Attorneys

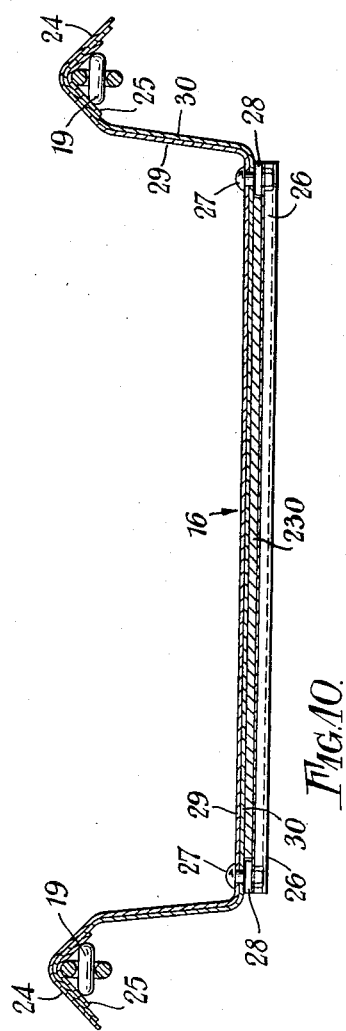

United States Patent Office 2,921,669
Patented Jan. 19, 1960

2,921,669

TROUGHED CONVEYOR

Featherstone Bainbridge, Newcastle-on-Tyne, England, assignor to Huwood Mining Machinery Limited, Gateshead-on-Tyne, England Application March 16, 1956, Serial No. 571,998

Claims priority, application Great Britain March 16, 1955

5 Claims. (Cl. 198—196)

This invention concerns apron conveyors of the kind comprising a series of transverse metal slats attached to endless flexible means to form a continuous apron and turned up at their ends to give the conveyor semblance to a troughed belt conveyor.

An object of the invention is to provide an improved construction securing efficient traverse of the apron in use and lessening of noise in operation, of advantageous application on long stretches and desirably proof against derangement of the apron or its parts during running of the conveyor.

According to the present invention, an apron conveyor of the above kind has the metal slats affixed to an endless flexible belt construction movable over rollers or drums at the ends of the conveyor, the turned-up ends of the slats having outwardly directed formations resting on endless chains or cables to which drive is applied for moving the apron during use of the conveyor.

For its return run, the conveyor apron suitably is arranged to travel beneath the upper or conveying run on wheels or rollers in fixed positions. At this time, the outwardly directed formations of the turned-up slat ends may be operative to support the return run of the endless chains or cables and maintain driving relation with them.

Drive for the chains or cables is preferably effected by driving sprockets or pulleys disposed within one end of the conveyor in the case of conveyors of comparatively short or medium length. For conveyors serving long stretches, for example conveyors used in coal mines, the chains or cables may be subdivided, that is to say several chain or cable units of comparatively short length may be used at spaced-apart positions along the conveyor and individual driving sprockets or pulleys be provided for the chains or cables of each unit.

In some cases, particularly of long or very long conveyors, it is preferred, after normal manner, to divide the frame of the conveyor into sections from end-to-end, the sections including end units carrying the end rollers or drums for the endless conveyor apron.

Figure 5:
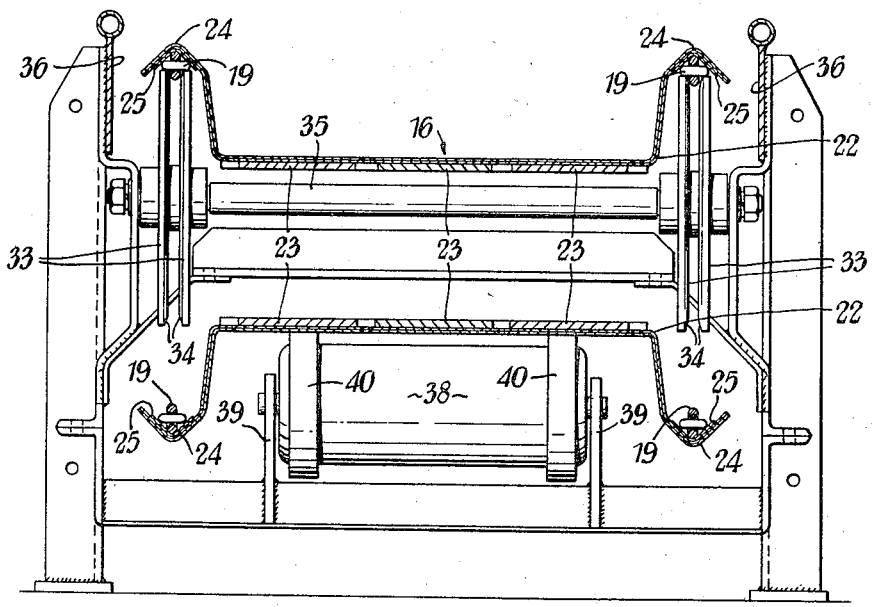
Figure 8:
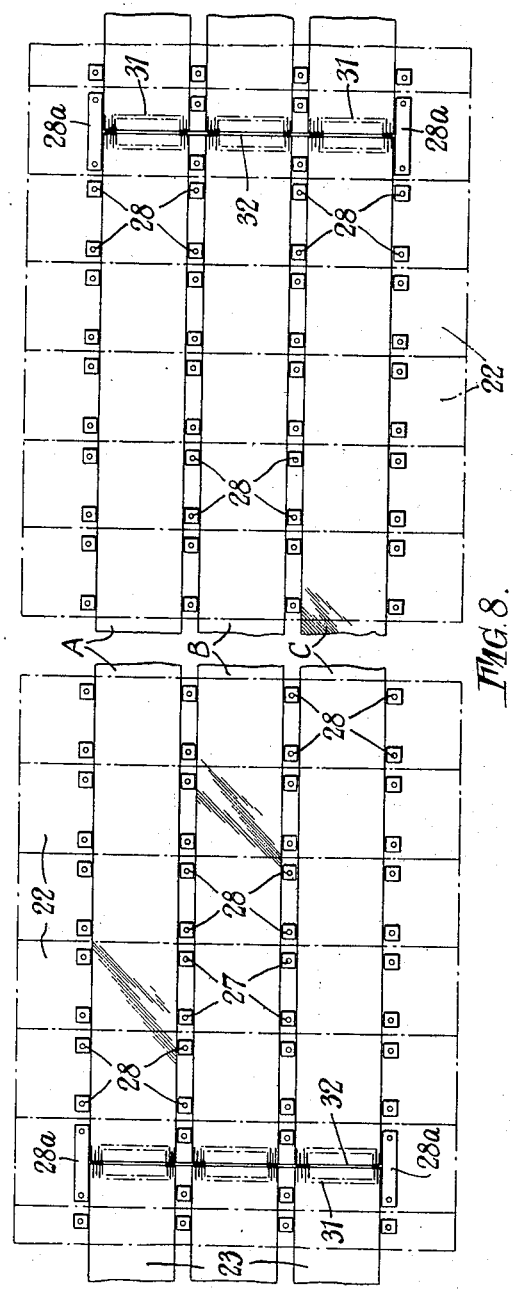
Figure 9:

In order to enable the invention to be readily understood, reference is directed by way of example to the accompanying drawings in which:

Figures 1, 2 and 3, when placed end-to-end, represent one embodiment of the conveyor of the invention in elevation, Figure 4 is a plan view of such embodiment partly broken away, Figure 5 a transverse section of the conveyor on a larger scale than Figures 1 to 4, the section being taken, for instance, along the line V—V of Figure 1 and certain parts being omitted, Figure 6 a transverse section on a still larger scale of the apron of the conveyor and showing driving chains for the apron, Figure 7 a fragmentary view being a section along the line VII—VII of Figure 6 and also showing the relative movement of the slats of the apron as it moves around an end drum, Figure 8 a fragmentary plan somewhat diagrammatically illustrating the belt construction and the preferred manner of making the conveyor apron, Figure 9 a diagrammatic elevation illustrating another embodiment of the conveyor of the invention. Figure 10 is a view corresponding to Figure 6, but illustrating a modification of the belt construction.

As shown in Figures 1 to 3, the first embodiment comprises a sectional framework including end sections 10, 11 and a series of intermediate sections 12. The sections are joined together at 13 on assembly of the conveyor and the end sections carry respective rollers or drums 14, 15 for the conveyor apron 16 which is shown diagrammatically in Figures 1 to 3. The end section 10 constitutes a delivery unit for the conveyor and the other 11 a take-up or tension unit for the apron, its roller or drum 15 being adjustable therein. Within the framework and just on the inside of the end units are respective auxiliary end units 17, 18 for driving chains 19 of the conveyor apron 16. These auxiliary end units embody sprockets 20 for the driving chains. The one at the delivery end may embody, or be associated with, a motor 21 for driving the chains. The one at the other end has its sprockets for the driving chains adjustable for take-up purposes.

The conveyor apron 16 comprises a continuous series of metal slats 22 combined with a flexible endless belt means or construction which, as shown in Figures 5 to 8, comprises three belts 23 disposed side by side at a small spacing apart laterally from one another and suitably made of balata, see Figures 5 to 8. The slats are turned up at the ends so as to impart a trough-like form to the apron. At the top these turned-up parts terminate in outwardly-directed gable-shaped parts 24 provided within the gable with friction surfaces 25, as by fitting portions of friction material similar to brake lining. By the gable formations, the slats 22 rest on the driving chains 19 of which one extends along each side of the conveyor. The respective friction surfaces 25 provide driving engagement between the driving chains and the slats and thus enable the chains to drive the endless apron 16.

The metal slats may be secured to the flexible belt construction 23 in any suitable manner. They are laid across one face of the combination of belts and are shown secured by corrugated plates 26 on the other face and cup-head bolts 27. The latter are passed through the slats and plates and through square spacing washers 28, of a thickness just slightly less than the belts, disposed in the spaces between the belts and at the outer edges of the set of belts, see Figures 6 to 8. In this way the slats are held in place on the set of belts 23 by clamping and have a frictional grip on the belts. The slats are suitably composed of interfitting male and female pressings 29, 30, respectively (Figures 6 and 7), which, as shown in Figure 7, are displaced one with respect to the other in the length direction of the apron 16, so that the slats overlap one another and leakage of conveyed material through the joints between the slats is prevented.

It is preferred to make the apron 16 in sections joined end-to-end, and one such section (broken away across the middle) is illustrated in Figure 8 together with fragmental portions of the sections adjoining the same. Each section comprises three belt strips indicated, as regards the one section in Figure 8, by the letters, A, B and C. The belt strips, throughout the apron, may be of a chosen standard length and they are shown connected together by belt fasteners of known type (comprising wire hooks 31 and joint pins 32 inserted through the mated hooks), which cause little, if any, increase in the thickness of the belts 23 at the joints. A single joint pin 32 may serve all the belt strips at each joint between the apron sections. In assembling an apron section, slats 22, shown in dot-and-dash lines in Figure 8 and comprising the male and female parts 29, 30 overlapped as aforesaid, are laid one by one along the three strips of belting A, B, C leaving a space of approximately half-slat width exposed at each end of the strips. The strips are secured in place individually, by the appropriate plates 26, bolts 27 and spacing washers 28, as the assembling proceeds. After having made up a number of sections in the above manner, a complete endless conveying length, i.e. an apron 16, can be made up by bringing the sections end-to-end and inserting joint pins 32 through the adjoining fastener hooks 31, and finally completing the apron by bolting the pressings 29, 30 of a single slat and a plate 26 over each joint between the sections. It will thus be apparent that the construction enables an apron of any desired length to be built up from relatively short lengths making for considerable convenience in handling, while all joints between the lengths will be completely hidden from view and out of contact with material being conveyed. The setting-out of the slat securing bolts 27 and spacing washers 28 will be readily understood from Figure 8. At the joints between the apron sections an elongated form of washer 28a, holed for a bolt 27 at each end, may be used at the outer edges of the sections to keep the joint pins 32 in place.

The driving chains 19 are of closed-link type and supported at intervals along the length of the conveyor, on their upper or conveying flight, by idler rollers 33. As shown in Figure 5, these rollers have the form of two discs spaced about the thickness of a chain link apart and chamfered at their adjacent peripheral edges at 34. The horizontal links of the chains will rest on the discs and the vertical ones take between the discs aided by the chamfering, as shown. These chain rollers 33 are disposed revolubly at opposite ends of transverse shafts 35 fixed in the conveyor framework and they are suitably shielded on the outside of the framework e.g. by the conveyor side plates 36 Figure 5 and/or shields 37, Figures 1 to 3. It will be apparent that on the conveying or upper run, the conveyor apron 16 can be supported over almost the whole of its length by such rollers.

On its lower flight the apron is supported at intervals on shuttle-like lower idler rollers 38 mounted between supports 39 uprising from underframe parts of the conveyor sections. The effective parts or rims 40 of these rollers 38 comprise sound-deadening material for example rubber. The metal slats 22 run on them with the sides of the apron trough overhanging them on the outside of the supports 39, Figure 5. The gable parts 24 on these sides will be inverted, of course, and as is apparent from the drawing they support the return flight of the driving chains which rest in them on the aforesaid friction surfaces 25 and travel with them.

The auxiliary end units 17, 18, carrying the driving-chain sprockets 20, are disposed beneath the upper run of the conveyor apron 16 where it rises at an incline at each end to the belt rollers or drums 14, 15 in the main end units, Figures 1 and 3. Over the bulk of this run, the apron is at a lower and even level. This kind of path for conveyor belts and the like is, of course, common practice in mine conveyors. In the present invention, the driving chains 19 do not rise with the upper flight of the conveyor apron at the ends but pass horizontally to their sprockets 20 and there is no engagement of the apron 16 with the chains adjacent the ends of the conveyor. Where the upper flight of the apron rises at the ends and thus is not supported there by the chains 19, spaced-apart cylindrical idler rollers 41 may be used for travel of the apron to or from the belt rollers or drums 14, 15. Suitably, the chain sprockets 20 at the tension end of the conveyor are made independently adjustable for take-up purposes.

It will be apparent that the application of the metal slats 22 to a flexible belt construction which runs on end rollers or drums 14, 15 and is supported intermediately by the slats on the chains 19, substantially without relative movement between the slats and the chains, will reduce noise during travel of the conveyor apron 16 on its operative flight. The lower flight of the apron is also supported in a noise-avoiding manner by the lower idlers 38. The weight of the material being conveyed on the apron will act to weight the gable-parts 24 of the metal slats and their friction surfaces 25 on to the driving chains 19, so that not only will the slats be driven individually by the chains, but also the drive will be a firm one. The chains will also impart a certain amount of drive to the slats on the return run of the apron. In turn, the gable parts on this run support the chains substantially without relative movement between the two and thus reduce noise from these parts in their return travel. Moreover, there should be no tendency of the apron to ride off the supporting chains on its operative flight.

According to the embodiment of the invention shown in Figure 9, which is intended for relatively long conveyors such as are met with in coal mines, two driving chain units, of which the driving chains are marked 19a, 19b, are employed each operative over a selected part-length of the conveyor. The arrangement might be such that the chains of each unit pass over a dozen of the supporting idler rollers, such as 33 aforesaid, of the upper apron flight. The chains 19a, 19b are brought to driving and return sprockets 20a of smaller diameter than the distance between the upper and lower apron flights and individual drive motors (not shown), would be provided for the units. More than two driving units of the above nature may be needed, of course, to suit particular circumstances. With a set of two or more units of this nature arranged at selected points along the length of the conveyor, effective drive of the conveyor apron is possible in spite of extended length thereof. Conveyors of this construction are therefore of advantageous use on long inclined faces, and long inclined drifts, for example, surfacing drifts, in coal mines.

It will also be apparent that other embodiments are possible without departing from the scope of the invention. For example, driven endless wire ropes could be used as an alternative to the chains for traversing the conveyor apron. In appropriate instances, the number of belts, such as 23, comprised in the endless flexible belt construction, could be less or greater than three. For example, in a small conveyor, a single belt 230 could be used with the slats 29, 30 frictionally clamped to it in similar manner to that described for three belts, except that the clamping bolts, such as 27, would only be at each side of the belt as illustrated in Figure 10. The rollers or idlers disposed along the length of the conveyor to support the chains or cables and apron may be of self-lubricating type as will be understood.

It is to be understood that the term "cable" as used hereinbefore and in the appended claims is intended to cover according to its ordinary signification both chain and rope.

I claim:
1. An apron conveyor comprising a frame, idlers rotatably mounted on said frame one at each end of the conveyor, an endless flexible belt means trained over said idlers, an endless series of metal slats attached transversely to said belt means and overlapping one another in the direction of the length of said belt means and having their ends at the sides of said belt means turned up with the extremities of such turned-up ends shaped into cable-engaging formations, such slats with said ends and formations constituting a continuous metal conveying apron which is of trough form and has continuous cable-engaging channels one at each side, idler rollers rotatably mounted at intervals along said frame, endless driving cables supported on said idler rollers and engaged with said continuous cable-engaging channels to drive and support said apron along its upper conveying run, and drive means for said cables.

2. An apron conveyor according to claim 1, wherein further idler rollers with peripheral parts of sound-deadening material are rotatably mounted on the frame to engage the metal slats of the apron and support the apron and belt means on their return run, beneath the upper run, and the cable-engaging channels are adapted, on the return run, to continuously support the return runs of the driving cables and maintain driving engagement therewith.

3. An apron conveyor according to claim 1, wherein the belt means comprises a set of endless flexible belts disposed side by side spaced a short distance apart laterally from one another, the metal slats being laid transversely across one face of said set of belts, the conveyor further comprising bolts passed through the slats at the spaces between the belts to secure the slats to the belts, spacing washers of less thickness than the belts applied to said bolts in said spaces, and retaining means for the bolts on the other face of said set of belts.

4. An apron conveyor according to claim 1, wherein the metal slats are individually composed of interfitting male and female pressings displaced the one with respect to the other in the length direction of the conveyor to provide for the overlap.

5. An apron conveyor comprising a frame, idlers rotatably mounted on said frame one at each end of the conveyor, an endless flexible belt means trained over said idlers, an endless series of metal slats attached transversely to said belt means to overlap one another in the direction of the lengths of said belt means and having their ends at the sides of said belt means turned up with the extremities of such turned-up ends shaped into cable-engaging formations, frictional material applied to such formations, such slats with said ends and formations and material constituting a continuous metal conveying apron which is of trough form and has continuous cable-engaging friction-lined channels one at each side, idler rollers rotatably mounted at intervals along said frame, endless driving chains of closed-link type supported by said idler rollers, which rollers have peripheral edge parts spaced apart axially of said rollers a distance to receive therebetween the thickness of a link of the chains, said chains being engaged within said continuous friction-lined channels to drive and support the apron along its upper conveying run, and drive means for said chains.

References Cited in the file of this patent

UNITED STATES PATENTS

| | | |
|---|---|---|
| 443,488 | St. Clair | Dec. 23, 1890 |
| 826,312 | Catlin | July 17, 1906 |
| 1,726,555 | Gammeter | Sept. 3, 1929 |
| 2,169,623 | Weiss et al. | Aug. 13, 1939 |
| 2,489,440 | Vallance | Nov. 29, 1949 |
| 2,510,212 | Donnell | June 6, 1950 |
| 2,732,930 | Thomson | Jan. 31, 1956 |
| 2,747,726 | Robins | May 29, 1956 |

FOREIGN PATENTS

| | | |
|---|---|---|
| 1,075,312 | France | Apr. 14, 1954 |